US012220066B2

(12) United States Patent
Gundala et al.

(10) Patent No.: US 12,220,066 B2
(45) Date of Patent: Feb. 11, 2025

(54) ROTATABLE SHARED ARMREST

(71) Applicant: B/E Aerospace, Inc., Winston-Salem, NC (US)

(72) Inventors: Sateesh Gundala, Andhra Pradesh (IN); Sambasiva Rao Kodati, Vinjaram (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 155 days.

(21) Appl. No.: 18/090,193

(22) Filed: Dec. 28, 2022

(65) Prior Publication Data

US 2023/0232991 A1 Jul. 27, 2023

(30) Foreign Application Priority Data

Jan. 22, 2022 (IN) .............................. 202241003735

(51) Int. Cl.
*A47C 7/54* (2006.01)
(52) U.S. Cl.
CPC .................................. *A47C 7/541* (2018.08)
(58) Field of Classification Search
CPC ...................................................... A47C 7/541
USPC ........................................ 297/411.32, 411.35
See application file for complete search history.

(56) References Cited

U.S. PATENT DOCUMENTS

| | | | | |
|---|---|---|---|---|
| 1,500,524 A * | 7/1924 | Phillips | ................... | A47C 7/543 |
| | | | | 297/411.34 |
| 1,802,620 A * | 4/1931 | Scully | ................... | B60N 2/787 |
| | | | | 297/411.32 |
| 3,893,729 A * | 7/1975 | Sherman | ................ | B60N 2/062 |
| | | | | 244/118.6 |
| 3,926,473 A * | 12/1975 | Hogan | ................... | B60N 2/763 |
| | | | | 297/115 |
| 4,052,103 A * | 10/1977 | Steinthal | ................ | B60N 2/793 |
| | | | | 297/411.32 |
| 5,037,157 A * | 8/1991 | Wain | ....................... | B60N 2/76 |
| | | | | 297/411.32 X |
| 6,468,450 B1 | 10/2002 | Takei | | |
| 6,513,877 B1 * | 2/2003 | Ikeda | ..................... | B60N 2/767 |
| | | | | 264/46.7 |
| 6,520,576 B1 * | 2/2003 | Burns | .................... | B60N 3/101 |
| | | | | 297/188.14 |
| 6,547,323 B1 * | 4/2003 | Aitken | ................... | B60N 2/793 |
| | | | | 297/411.32 X |

(Continued)

FOREIGN PATENT DOCUMENTS

| | | |
|---|---|---|
| EP | 2698276 B1 | 5/2015 |
| EP | 3590759 A1 | 1/2020 |

(Continued)

OTHER PUBLICATIONS

Extended European Search Report dated May 19, 2023; European Application No. 23152437.2.

*Primary Examiner* — Rodney B White
(74) *Attorney, Agent, or Firm* — Suiter Swantz IP

(57) ABSTRACT

A rotatable armrest includes a shaft to allow the arm pad to rotate and a locking mechanism defining a set of stopping positions. The profile of the arm pad is defined to clearly delineate portions of the expanded arm pad for each passenger. The rotatable armrest may also include a cam driven divider that extends from the arm pad as the arm pad is rotated to further define delineate portions of the expanded arm pad for each passenger.

16 Claims, 15 Drawing Sheets

(56) References Cited

U.S. PATENT DOCUMENTS

| | | | | |
|---|---|---|---|---|
| 6,793,282 B2* | 9/2004 | Plant | ............... | B60N 3/002 |
| | | | | 297/115 |
| 7,004,546 B1* | 2/2006 | Thisius | ............ | A47C 7/543 |
| | | | | 297/411.32 X |
| 7,959,231 B2* | 6/2011 | Lee | ............. | B64D 11/0646 |
| | | | | 244/118.6 |
| 8,528,861 B2* | 9/2013 | Kneller | ............ | B60N 2/757 |
| | | | | 297/411.32 X |
| 8,931,846 B2* | 1/2015 | Merensky | ....... | B64D 11/0643 |
| | | | | 297/411.32 X |
| 9,468,302 B2 | 10/2016 | Negusse | | |
| 9,522,618 B2* | 12/2016 | Almeida | ........... | B60N 2/763 |
| 9,828,101 B2* | 11/2017 | Shih | ............. | B64D 11/0644 |
| 10,104,972 B2* | 10/2018 | Cummins | ......... | A47C 7/543 |
| 10,279,717 B2* | 5/2019 | Ketels | ............ | B60N 3/002 |
| 10,953,777 B1* | 3/2021 | Rathore | ........... | A47C 7/543 |
| 11,318,871 B2* | 5/2022 | Line | ............... | B60N 2/682 |
| 11,926,421 B2* | 3/2024 | Patel | .............. | B60N 2/753 |
| 2004/0046430 A1* | 3/2004 | Plant | .............. | B60N 2/79 |
| | | | | 297/248 |
| 2005/0194828 A1* | 9/2005 | Johnson | .......... | B60N 2/7005 |
| | | | | 297/411.32 |
| 2015/0210395 A1 | 7/2015 | Saint-Jalmes | | |
| 2021/0291987 A1 | 9/2021 | Glain et al. | | |

FOREIGN PATENT DOCUMENTS

| | | | |
|---|---|---|---|
| JP | S60175159 U | * | 11/1985 |
| JP | 2017043229 A | | 3/2017 |
| WO | 2020025999 A1 | | 2/2020 |

* cited by examiner

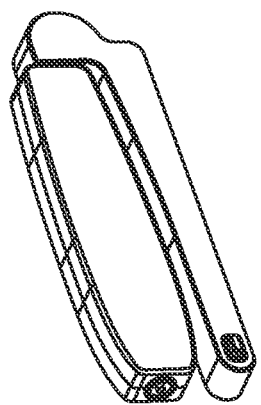
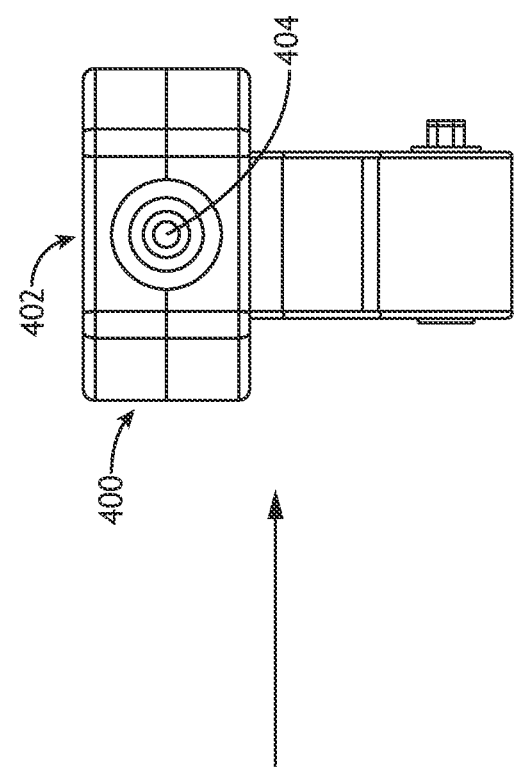
FIG. 4B
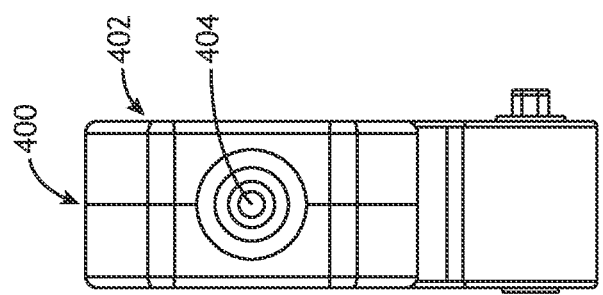
FIG. 4A

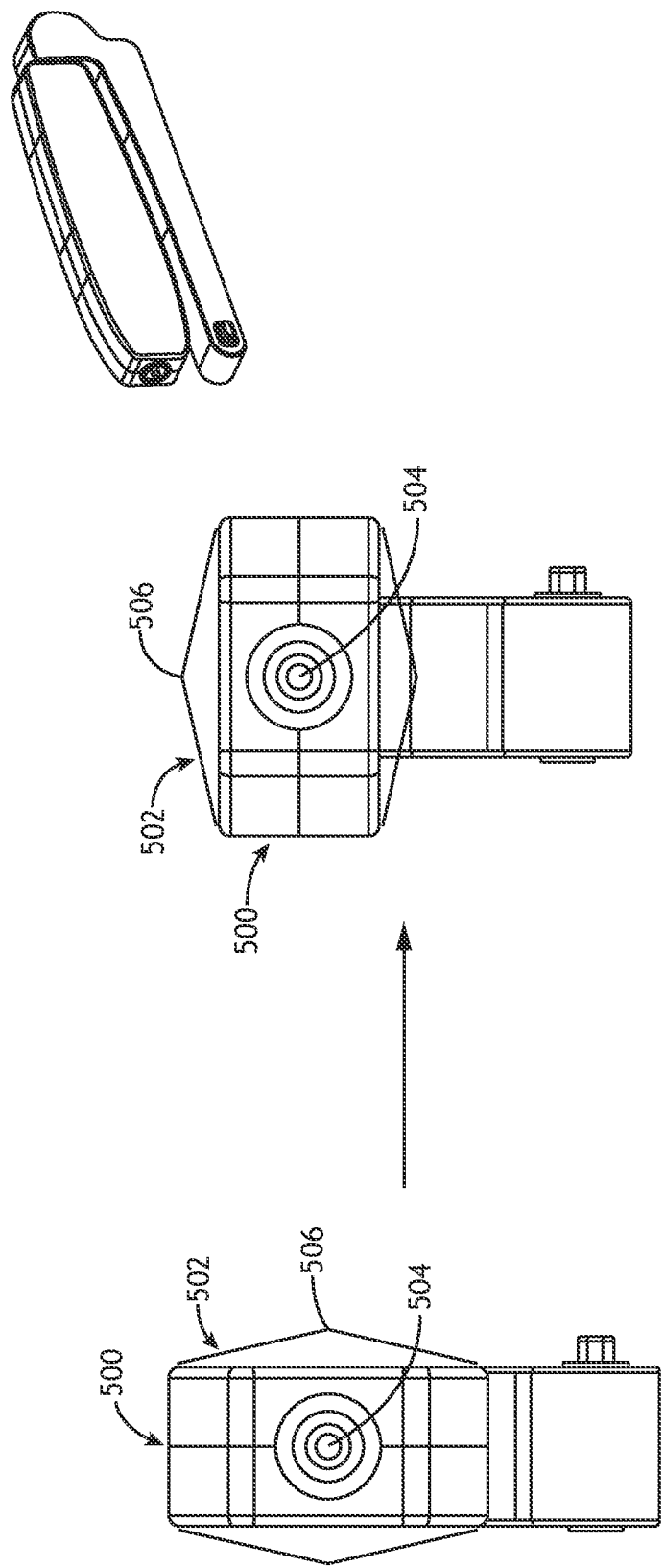

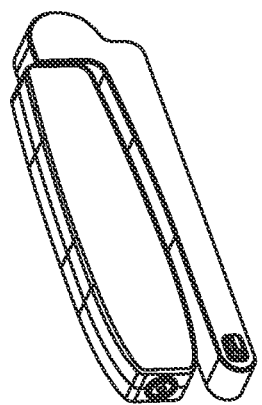
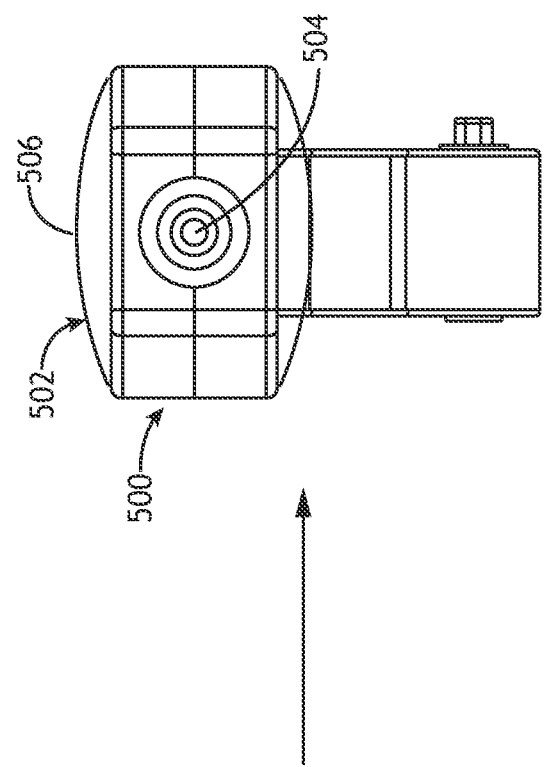
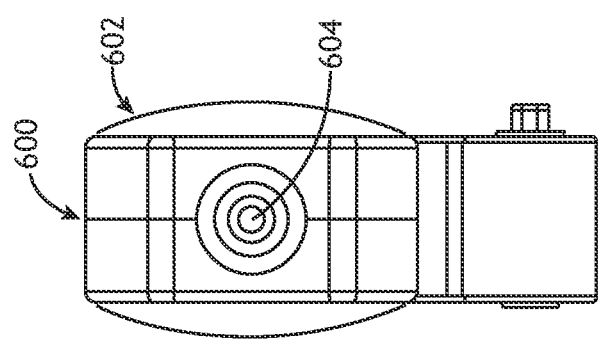
FIG. 6B
FIG. 6A

ROTATABLE SHARED ARMREST

PRIORITY

The present application claims the benefit under 35 U.S.C. § 119(a) of Indian Prov. App. No. 202241003735 (filed Jan. 22, 2022), which is incorporated herein by reference.

BACKGROUND

Many commercial aircraft seats utilize a shared armrest between two passengers. The shared armrest is a common source of complaints as existing designs offer insufficient space for both passengers. Immutable space constraints and safety considerations will not permit a larger armrest. It would be advantageous if a mechanism existed for afford passengers more room and better space delineation.

SUMMARY

In one aspect, embodiments of the inventive concepts disclosed herein are directed to a rotatable armrest. The rotatable armrest includes a shaft to allow the arm pad to rotate and a locking mechanism defining a set of stopping positions.

In a further aspect, the profile of the arm pad is defined to clearly delineate portions of the expanded arm pad for each passenger.

In a further aspect, a cam driven divider extends from the arm pad as the arm pad is rotated to further define delineate portions of the expanded arm pad for each passenger.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which:

FIG. 4A shows a front view of a rotatable armrest in a first configuration according to an exemplary embodiment;

FIG. 4B shows a front view of a rotatable armrest in a second configuration according to an exemplary embodiment;

FIG. 5A shows a front view of a rotatable armrest in a first configuration according to an exemplary embodiment;

FIG. 5B shows a front view of a rotatable armrest in a second configuration according to an exemplary embodiment;

FIG. 6A shows a front view of a rotatable armrest in a first configuration according to an exemplary embodiment;

FIG. 6B shows a front view of a rotatable armrest in a second configuration according to an exemplary embodiment;

DETAILED DESCRIPTION

Figure 1A:
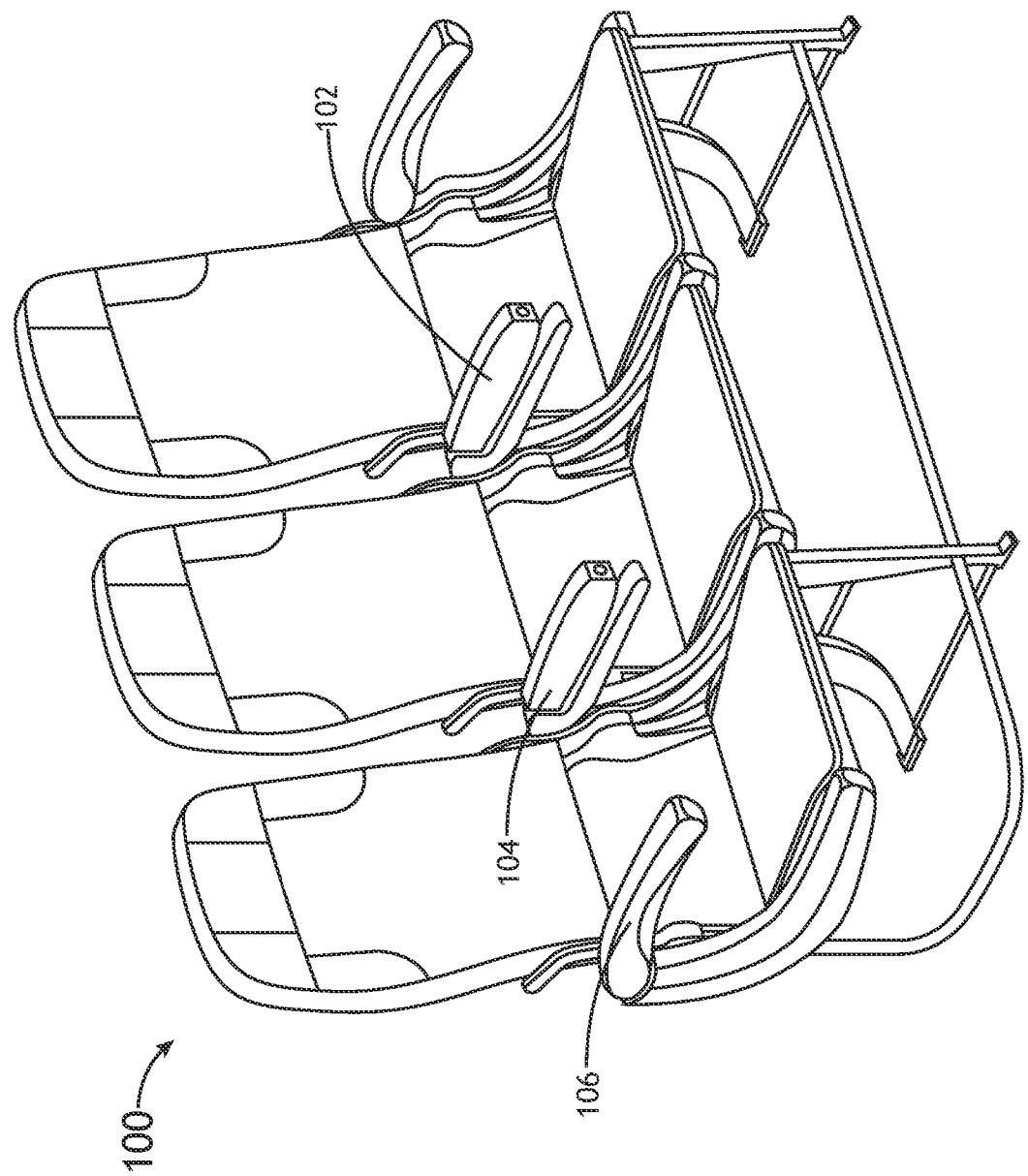
FIG. 1A shows an environmental view of a rotatable armrest in a first configuration according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a rotatable armrest. The rotatable armrest includes a shaft to allow the arm pad to rotate and a locking mechanism defining a set of stopping positions.

Figure 1B:
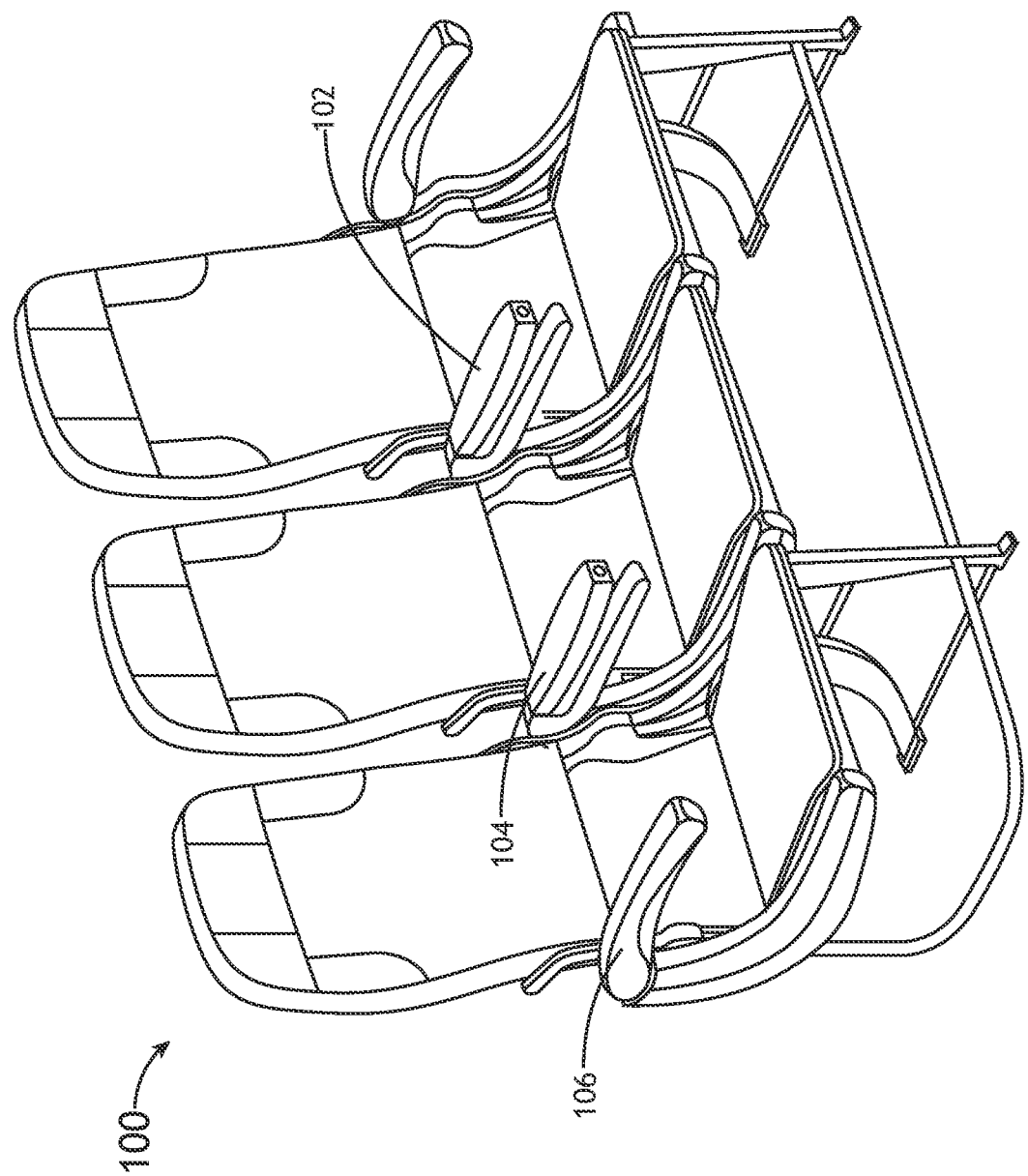
FIG. 1B shows an environmental view of a rotatable armrest in a second configuration according to an exemplary embodiment.

Referring to FIGS. 1A-1B, environmental views of a rotatable armrest 102, 104 according to an exemplary embodiment are shown. A set of commercial aircraft seats 100 may include traditional armrests 106 designed for a single passenger; for example, at the ends of each row; and rotatable armrests 102, 104 between passenger seats. The rotatable armrests 102, 104 may define a cross sectional profile with some surfaces that match the profile of the traditional armrest 106 for the comfort of the passengers.

The rotatable armrest 102, 104 may be placed in a first, vertical configuration 102 where the rotatable armrest 102, 104 is narrow. The first, vertical configuration 102 offers a superior contact surface that corresponds to the superior contact surface of the traditional armrest 106. When passengers desire more armrest space, the rotatable armrest 102, 104 may be placed in a second, horizontal configuration 104 where extended surface are rotated to become the superior contact surfaces.

Figure 2:
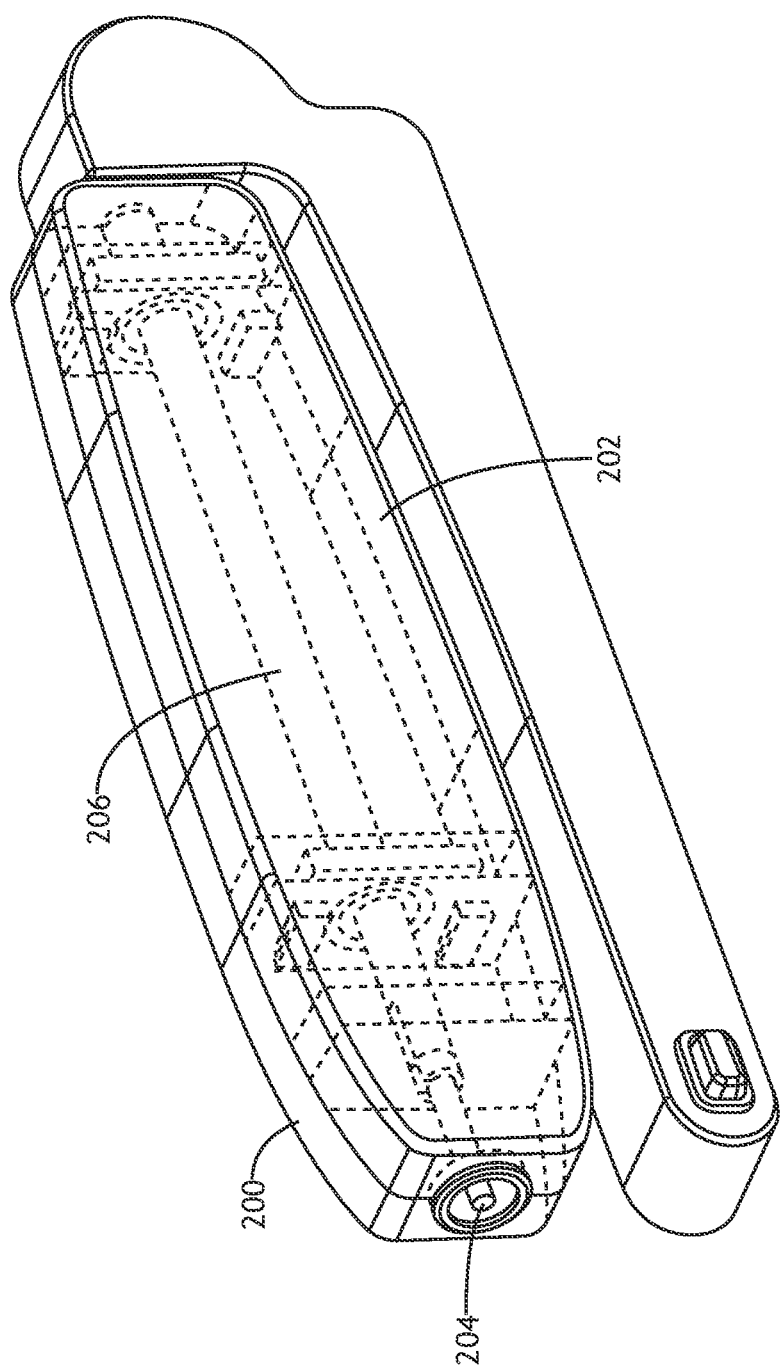
FIG. 2 shows a perspective detail view of a rotatable armrest according to an exemplary embodiment.

Referring to FIG. 2, a perspective detail view of a rotatable armrest according to an exemplary embodiment is shown. The rotatable armrest defines a vertical superior surface 200 that is the primary armrest surface when the rotatable armrest is in a vertical configuration, and a horizontal superior surface 202 that is the primary armrest surface when the rotatable armrest is in a horizontal configuration. A stationary shaft 206 defines the axis of rotation for the rotatable armrest, and a spring biased button 204 disengages a locking mechanism configured to maintain the rotatable armrest in one or a number of predefined orientations.

In at least one embodiment, the rotatable armrest includes a non-rotating portion for housing mechanisms such as a seat recline button, headphone jacks, etc. In some embodiments, the non-rotating portion may be unnecessary; for example, where the recline button is disposed in a non-rotating housing including the spring biased button 204, the non-rotating portion may be excluded.

Figure 3:
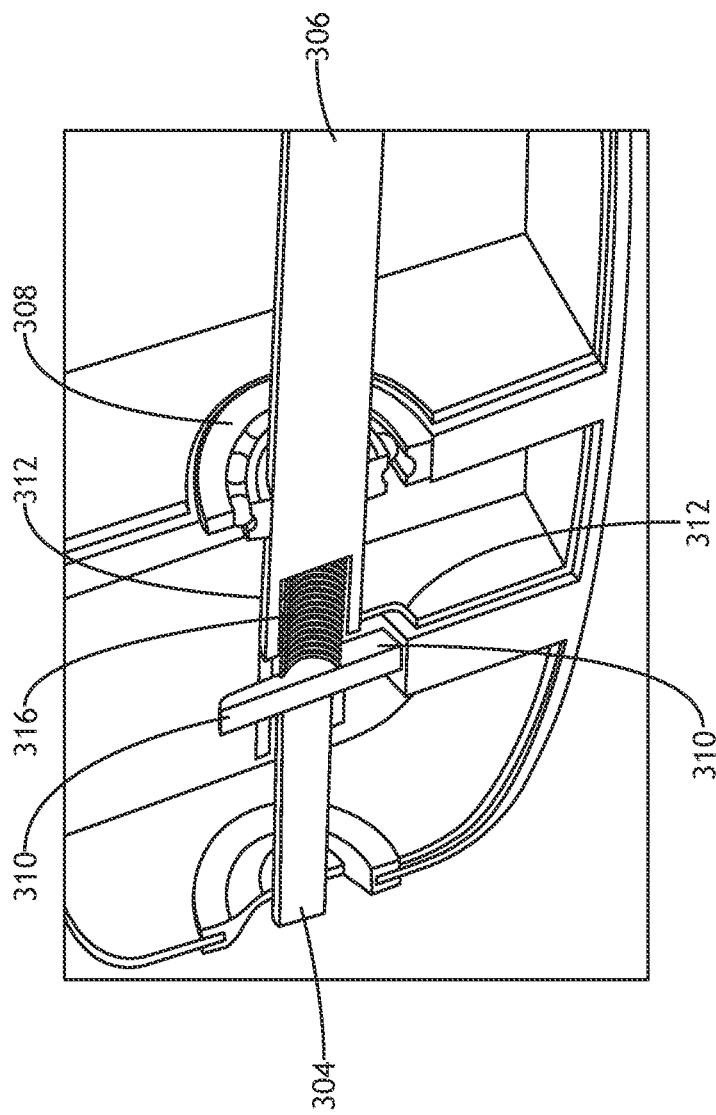
FIG. 3 shows a detail cross-sectional view of a locking mechanism in a rotatable armrest according to an exemplary embodiment.

Referring to FIG. 3, a detail cross-sectional view of a locking mechanism in a rotatable armrest according to an exemplary embodiment is shown. The rotatable armrest includes a stationary shaft 306 affixed to a structural component of the seat. In at least one embodiment, the stationary shaft 306 may engage internal structures of the arm pad via one or more bearings 308 that allow the arm pad to rotate about the stationary shaft 306.

A locking mechanism retains the arm pad in one of a number of possible orientations. In at least one embodiment, the locking mechanism comprises a release button 304 with one or more locking protrusions 310. The locking protrusions 310 engage locking recesses 312 defined by internal structures of the arm pad. The locking recesses 312 are disposed periodically about the stationary shaft 306 to stop the rotation of the arm pad at predefined points; for example, locking recesses 312 may be disposed every 90° around the stationary shaft 306 so that the arm pad may be locked in either a vertical or horizontal orientation.

In at least one embodiment, a biasing element 316 such as a spring or other linear actuator biases the button 304 and corresponding locking protrusions 310 toward a locked configuration where the locking protrusions 310 engage the locking recesses 312.

Referring to FIGS. 4A-4B, front views of a rotatable armrest according to an exemplary embodiment are shown. The rotatable armrest defines a narrow vertical superior contact surface 400 and wide horizontal superior contact surface 402. In a first, vertical orientation (as in FIG. 4A), the narrow vertical superior contact surface 400 is on top, where passengers routinely rest their arms. During some phases of flight where passengers are required to be minimally encumbered, the rotatable armrest would be in the first, vertical orientation.

When more armrest space is desired, a either passenger may push a button 404 to disengage an internal locking mechanism and rotate the rotatable armrest to a second, horizontal orientation (as in FIG. 4B) such that the wide horizontal superior contact surface 402 is on top. The wide horizontal superior contact surface 402 provides substantially double the area for passengers to rest their arms.

Referring to FIGS. 5A-5B, front views of a rotatable armrest according to an exemplary embodiment are shown. The rotatable armrest defines a narrow vertical superior contact surface 500 while in a first, vertical orientation (as in FIG. 5A), and a wide horizontal superior contact surface 502 while in a second, horizontal orientation (as in FIG. 5B). The rotatable armrest is releasably locked into either the first, vertical orientation or second, horizontal orientation via an internal locking mechanism, releasable via a button 504.

In at least one embodiment, the narrow vertical superior contact surface 500 is configured to generally correspond in profile and relative height to a non-rotatable, standard armrest. When in the first, vertical orientation, a passenger would not feel any difference between the rotatable armrest and a non-rotatable armrest.

In at least one embodiment, the wide horizontal superior contact surface 502 may define a slanted profile with a peak portion 506. The slanted profile provides a larger contact surface for each passenger as compared to a strictly horizontal surface. Furthermore, the peak portion 506 defines a tactile divider; passengers are able to feel the feel the peak portion 506 and know that it demarks each passenger's portion of the armrest.

Referring to FIGS. 6A-6B, front views of a rotatable armrest according to an exemplary embodiment are shown. In at least one embodiment, the narrow vertical superior contact surface 600 is configured to generally correspond in profile and relative height to a non-rotatable, standard armrest. When in the first, vertical orientation, a passenger would not feel any difference between the rotatable armrest and a non-rotatable armrest. In at least one embodiment, the wide horizontal superior contact surface 602 may define a curved profile. The curved profile provides a larger contact surface for each passenger as compared to a strictly horizontal surface and may provide a subtle tactile divider that passengers are able to feel.

Figure 7:
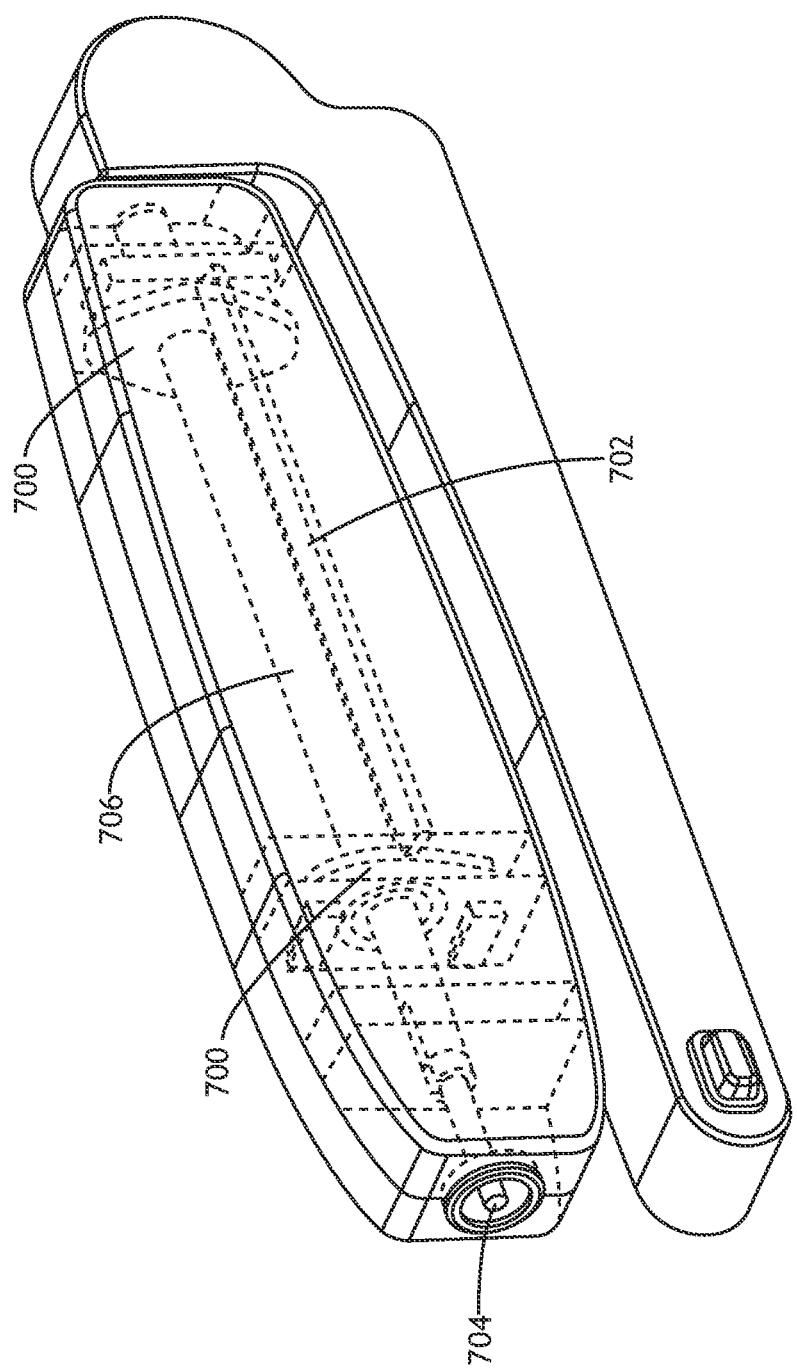
FIG. 7 shows a perspective detail view of a rotatable armrest according to an exemplary embodiment.

Referring to FIG. 7, a perspective detail view of a rotatable armrest according to an exemplary embodiment is shown. Where a rotatable armrest includes a stationary shaft 706 and button 704 to release an internal locking mechanism, the rotatable armrest may include one or more cams 700 configured to control the movement of one or more extendable dividers 702. Wide, horizontal superior surfaces of the rotatable armrest may define openings to allow the extendable dividers 702 to protrude above the surface when in a horizontal orientation.

Figure 8:
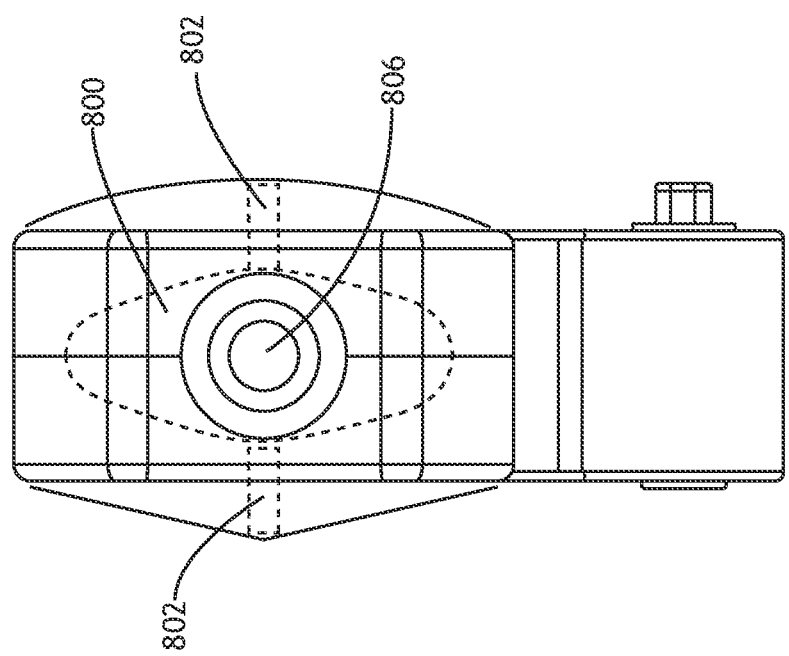
FIG. 8 shows a front detail view of a rotatable armrest according to an exemplary embodiment.

Referring to FIG. 8, a front detail view of a rotatable armrest according to an exemplary embodiment is shown. The rotatable armrest includes a stationary shaft 806 that defines an axis of rotation for the rotatable armrest. In at least one embodiment, one or more cams 800 are disposed in a fixed position relative to the stationary shaft 806. The cams 800 define a profile to control the movement of extendable dividers 802. The extendable dividers 802 may be biased to stay inside the rotatable armrest when in a vertical orientation to prevent the extendable dividers from being an encumbrance. While the rotatable armrest is being rotated into a horizontal configuration, the cams 800 push the extendable dividers 802 though openings in the wide horizontal superior surface. The extendable dividers 802 provide a delineation between passenger space.

Figure 9A:
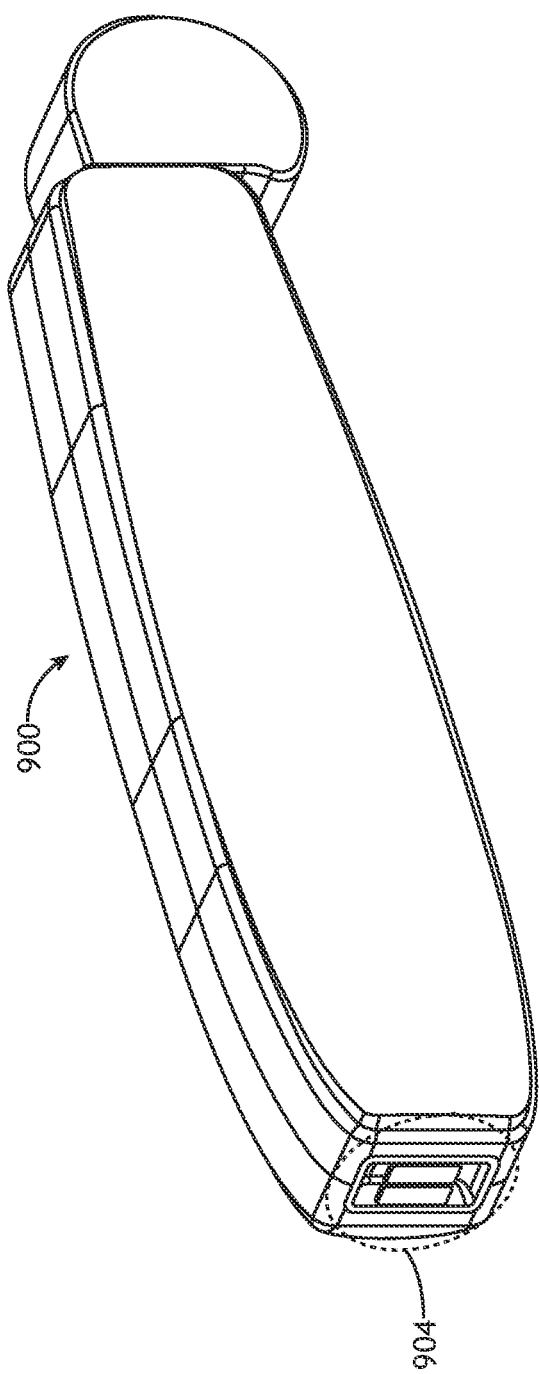
FIG. 9A shows a perspective view of a rotatable armrest in a first configuration according to an exemplary embodiment.
Figure 9B:
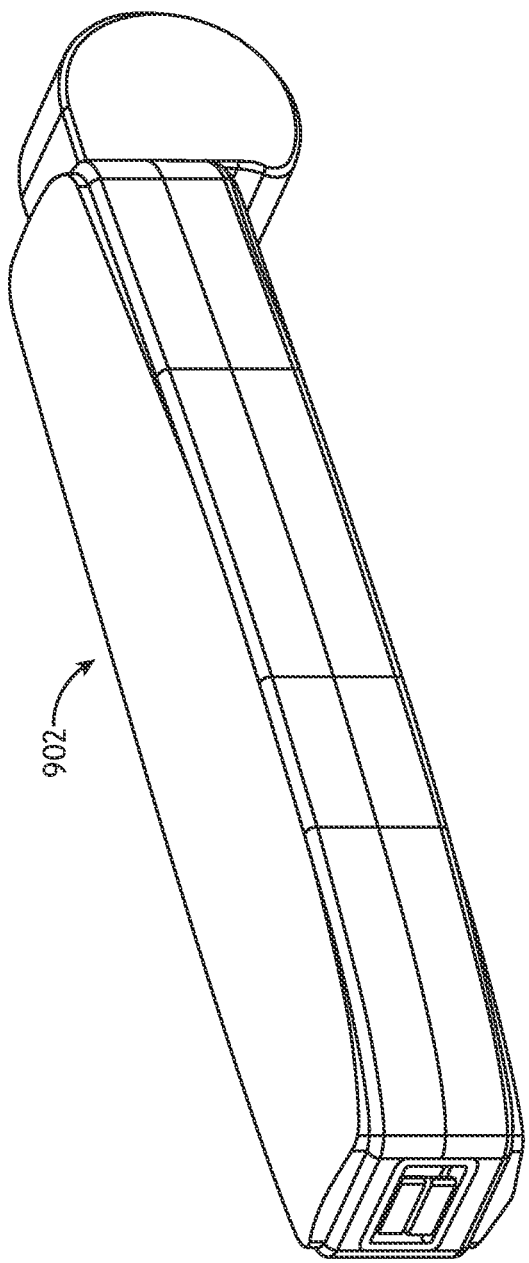
FIG. 9B shows a perspective view of a rotatable armrest in a second configuration according to an exemplary embodiment.
Figure 9C:
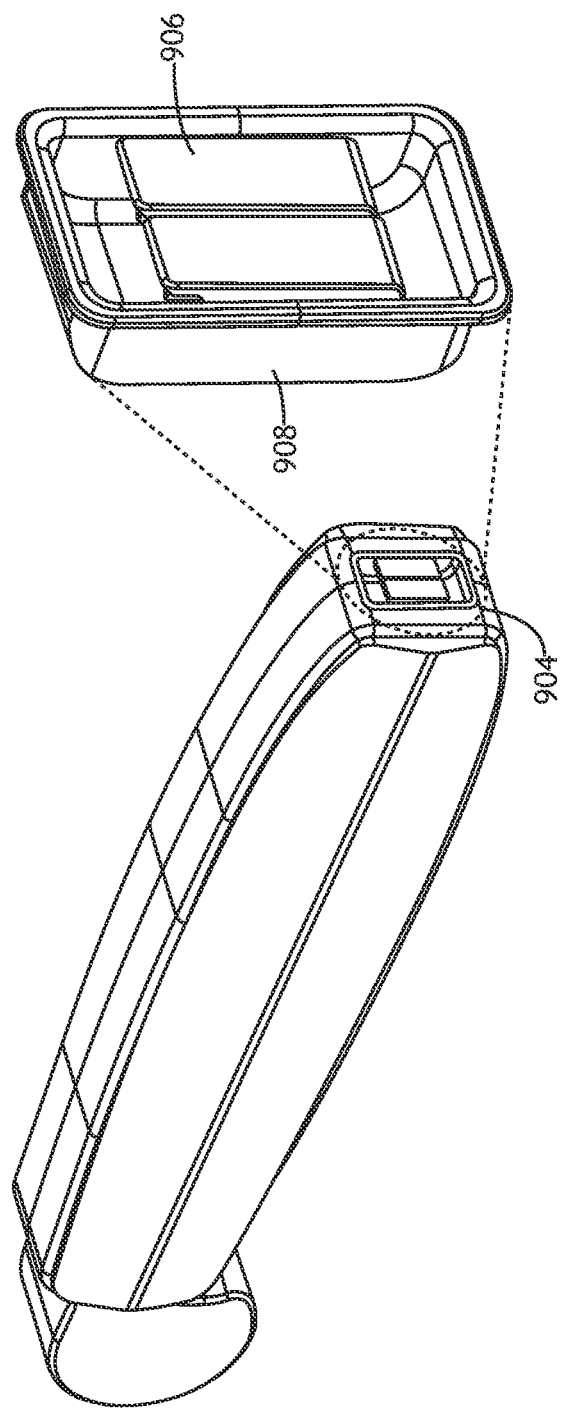
FIG. 9C shows a perspective detail view of a rotatable armrest according to an exemplary embodiment.

Referring to FIGS. 9A-9C, perspective views of a rotatable armrest 900, 902 according to an exemplary embodiment are shown. In at least one embodiment, it may desirable to obviate the need for a non-rotating portion housing mechanisms such as a seat recline button, headphone jacks, etc. In such embodiments, the rotatable armrest 900, 902 may include aircraft seat utility mechanisms 904 such as a seat recline button 908 in addition an armrest rotation button 906. In some embodiments, the seat utility mechanisms 904 may be affixed to the armrest housing and therefore configured to rotate with the armrest 900, 902. It may be appreciated that in such embodiments, the mechanisms that effectuate seat utility, such as the recline function, must be flexible enough to operate in either a vertical configuration 900 or a horizontal configuration 902; for example, a cable.

Figure 10A:
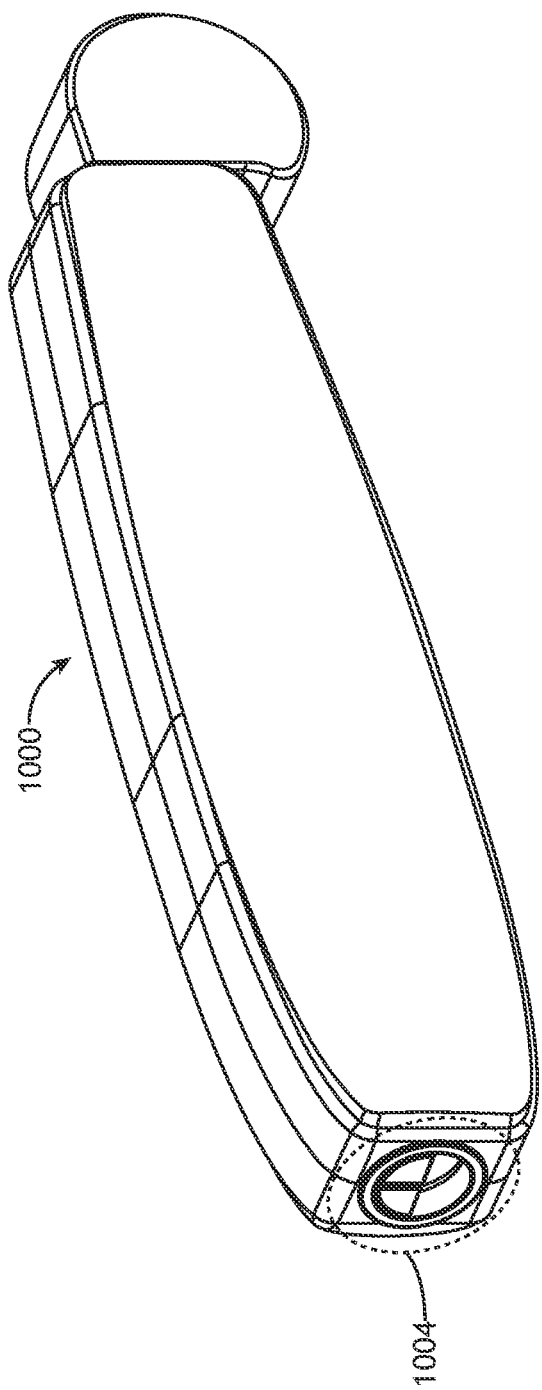
FIG. 10A shows a perspective view of a rotatable armrest in a first configuration according to an exemplary embodiment.
Figure 10B:
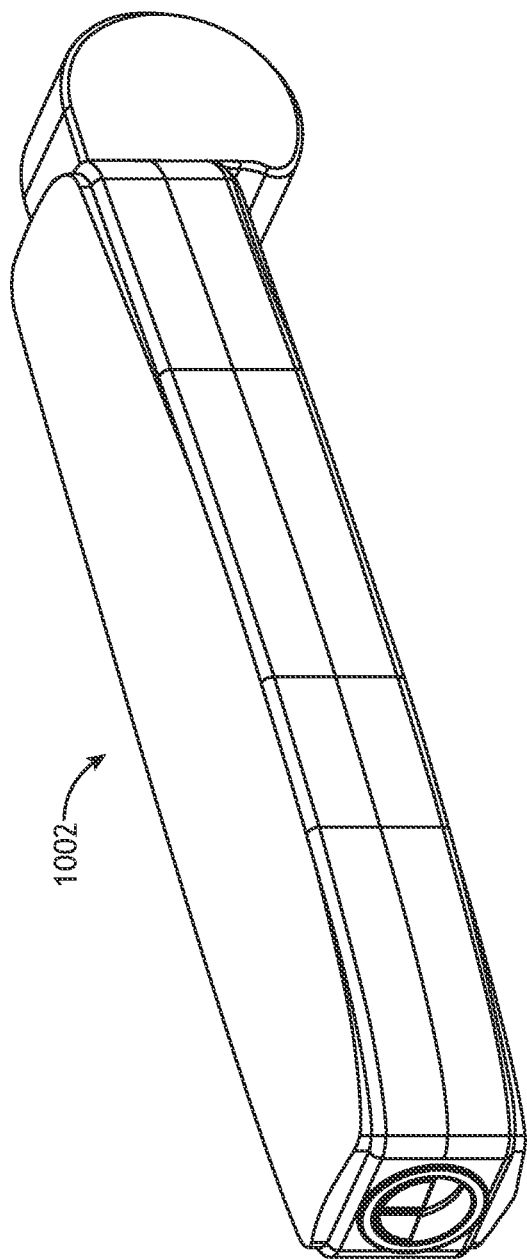
FIG. 10B shows a perspective view of a rotatable armrest in a second configuration according to an exemplary embodiment.
Figure 10C:
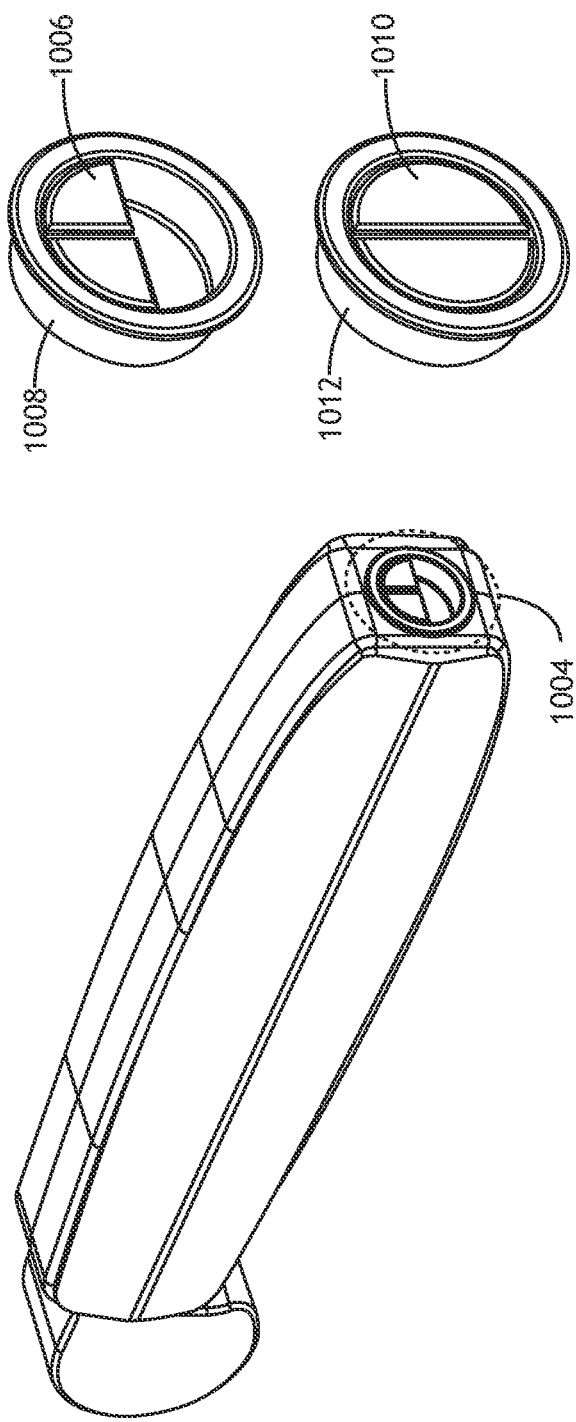
FIG. 10C shows a perspective detail view of a rotatable armrest according to an exemplary embodiment.

Referring to FIGS. 10A-10C, perspective views of a rotatable armrest according to an exemplary embodiment are shown. In at least one embodiment, where it is desirable to obviate the need for a non-rotating portion housing mechanisms such as a seat recline button, headphone jacks, etc., the rotatable armrest 1000, 1002 may include aircraft seat utility mechanisms 1004. A utility mechanism housing (including a seat recline button 1008, 1012 and armrest rotation button 1006, 1010) may be affixed to a stationary element within the armrest housing and therefore configured to remain stationary with respect to the armrest 1000, 1002 during rotation. It may be appreciated that in such embodiments, the mechanisms that effectuate seat utility, such as the recline function, may be substantially rigid.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A shared armrest comprising:
   at least one cam;
   at least one extendable divider;
   a stationary shaft;
   a rotatable armrest pad; and
   a locking mechanism,
   wherein:
      the rotatable armrest pad defines a first superior surface and a second superior surface, the second superior surface being wider than the first superior surface;
      the rotatable armrest pad configured to rotate about the stationary shaft from a first configuration, where the first superior surface is disposed at a top of the shared armrest, to a second configuration, where the second superior surface is disposed at the top of the shared armrest;
      the locking mechanism is configured to releasable retain the rotatable armrest pad in either the first configuration or the second configuration;
      the at least one extendable divider is configured to translate radially through an opening defined by the second superior surface; and
      the at least one cam is configured to direct the radial translation of the extendable divider as the rotatable armrest pad is rotated.

2. The shared armrest of claim 1, wherein the locking mechanism comprises:
   a button partially disposed within the stationary shaft; and
   a biasing element configured to bias the button toward a locking configuration.

3. The shared armrest of claim 2, wherein:
   the locking mechanism further comprises one or more locking protrusions, each configured to engage a locking recess; and
   the armrest pad comprises an internal structure defining a plurality of locking recesses disposed periodically about the stationary shaft, each configured to engage a locking protrusion of the locking mechanism.

4. The shared armrest of claim 3, wherein the plurality of locking recesses are disposed every 90° about the stationary shaft.

5. The shared armrest of claim 1, wherein the second superior surface comprises a curved profile.

6. The shared armrest of claim 1, wherein the second superior surface comprises an angled profile defining a peak along a centerline.

7. An aircraft seat comprising:
   at least one shared armrest comprising:
      a stationary shaft;
      a rotatable armrest pad; and
      a locking mechanism comprising:
         a button partially disposed within the stationary shaft; and
         a biasing element configured to bias the button toward a locking configuration,
      wherein:
         the rotatable armrest pad defines a first superior surface and a second superior surface, the second superior surface being wider than the first superior surface;

the rotatable armrest pad configured to rotate about the stationary shaft from a first configuration, where the first superior surface is disposed at a top of the shared armrest, to a second configuration, where the second superior surface is disposed at the top of the shared armrest;

the locking mechanism is configured to releasable retain the rotatable armrest pad in either the first configuration or the second configuration;

the locking mechanism further comprises one or more locking protrusions, each configured to engage a locking recess; and the armrest pad comprises an internal structure defining a plurality of locking recesses disposed periodically about the stationary shaft, each configured to engage a locking protrusion of the locking mechanism.

8. The aircraft seat of claim 7, wherein the plurality of locking recesses are disposed every 90° about the stationary shaft.

9. The aircraft seat of claim 7, further comprising:
at least one cam; and
at least one extendable divider,
wherein:
the at least one extendable divider is configured to translate radially through an opening defined by the second superior surface; and
the at least one cam is configured to direct the radial translation of the extendable divider as the rotatable armrest pad is rotated.

10. The aircraft seat of claim 7, wherein the second superior surface comprises a curved profile.

11. The aircraft seat of claim 7, wherein the second superior surface comprises an angled profile defining a peak along a centerline.

12. An armrest comprising:
at least one cam;
at least one extendable divider;
a stationary shaft;
a rotatable armrest pad; and
a locking mechanism,
wherein:
the rotatable armrest pad defines a first superior surface and a second superior surface, the second superior surface being wider than the first superior surface;
the rotatable armrest pad configured to rotate about the stationary shaft from a first configuration, where the first superior surface is disposed at a top of the shared armrest, to a second configuration, where the second superior surface is disposed at the top of the shared armrest;
the locking mechanism is configured to releasable retain the rotatable armrest pad in either the first configuration or the second configuration;
the at least one extendable divider is configured to translate radially through an opening defined by the second superior surface; and
the at least one cam is configured to direct the radial translation of the extendable divider as the rotatable armrest pad is rotated.

13. The armrest of claim 12, wherein the locking mechanism comprises:
a button partially disposed within the stationary shaft; and
a biasing element configured to bias the button toward a locking configuration.

14. The armrest of claim 13, wherein:
the locking mechanism further comprises one or more locking protrusions, each configured to engage a locking recess; and
the armrest pad comprises an internal structure defining a plurality of locking recesses disposed periodically about the stationary shaft, each configured to engage a locking protrusion of the locking mechanism.

15. The armrest of claim 12, wherein the second superior surface comprises a curved profile.

16. The armrest of claim 12, wherein the second superior surface comprises an angled profile defining a peak along a centerline.

* * * * *